United States Patent
Ding et al.

(10) Patent No.: US 6,710,965 B2
(45) Date of Patent: Mar. 23, 2004

(54) PHASE-ADVANCED FILTER FOR ROBUST RESONANCE CANCELLATION

(75) Inventors: Mingzhong Ding, Singapore (SG); KeXiu Liu, Singapore (SG); KianKeong Ooi, Singapore (SG)

(73) Assignee: Seagate Technology LLC, Scotts Valley, CA (US)

(*) Notice: Subject to any disclaimer, the term of this patent is extended or adjusted under 35 U.S.C. 154(b) by 272 days.

(21) Appl. No.: 10/055,110

(22) Filed: Jan. 22, 2002

(65) Prior Publication Data

US 2003/0076615 A1 Apr. 24, 2003

Related U.S. Application Data

(60) Provisional application No. 60/326,769, filed on Oct. 2, 2001.

(51) Int. Cl.[7] .............................................. G11B 5/596
(52) U.S. Cl. ............................................... 360/77.02
(58) Field of Search ........................... 360/77.02, 25, 360/29, 31, 39, 78.04, 75, 77.08, 78.09, 73.03, 77.04, 77.11

(56) References Cited

U.S. PATENT DOCUMENTS

| | | | | |
|---|---|---|---|---|
| 4,963,806 A | 10/1990 | Shinohara et al. | ............ | 318/621 |
| 4,980,625 A | 12/1990 | Shimada | ............ | 318/568.1 |
| 5,032,776 A | 7/1991 | Garagnon | ............ | 318/611 |
| 5,404,418 A | 4/1995 | Nagano | ............ | 388/806 |
| 5,483,398 A * | 1/1996 | Boutaghou | ............ | 360/97.02 |
| 5,576,976 A | 11/1996 | White | ............ | 364/572 |
| 5,636,193 A | 6/1997 | Ohmi | ............ | 369/53 |
| 5,867,342 A | 2/1999 | Hattori | ............ | 360/77.08 |
| 5,875,066 A * | 2/1999 | Ottesen | ............ | 360/77.11 |
| 5,936,787 A | 8/1999 | Ohmi | ............ | 360/73.03 |
| 5,960,091 A | 9/1999 | White et al. | ............ | 381/98 |
| 5,970,033 A * | 10/1999 | Nakano et al. | ............ | 369/44.29 |
| 5,995,317 A * | 11/1999 | Ottesen | ............ | 360/77.04 |
| 6,049,441 A * | 4/2000 | Ottesen | ............ | 360/77.04 |
| 6,067,362 A | 5/2000 | Lemanski et al. | ............ | 381/94.1 |
| 6,148,240 A | 11/2000 | Wang et al. | ............ | 700/63 |
| 6,219,196 B1 | 4/2001 | Semba et al. | ............ | 360/75 |
| 6,246,536 B1 * | 6/2001 | Galloway | ............ | 360/78.04 |
| 6,256,163 B1 | 7/2001 | Schmidt et al. | ............ | 360/78.09 |
| 6,335,845 B1 * | 1/2002 | Yamaguchi et al. | ............ | 360/75 |
| 6,417,982 B1 * | 7/2002 | Ottesen et al. | ............ | 360/77.02 |
| 6,574,065 B1 * | 6/2003 | Sri-Jayantha et al. | ............ | 360/75 |
| 6,636,376 B1 * | 10/2003 | Ho | ............ | 360/77.02 |
| 6,643,080 B1 * | 11/2003 | Goodner et al. | ............ | 360/31 |
| 6,661,599 B1 * | 12/2003 | Chen et al. | ............ | 360/77.04 |

* cited by examiner

*Primary Examiner*—David Hudspeth
*Assistant Examiner*—Fred F. Tzeng
(74) *Attorney, Agent, or Firm*—Merchant & Gould P.C.

(57) ABSTRACT

A filter for attenuating a resonance mode without substantial phase margin loss. The filter comprises a transfer function having an additional pole, such that the phase of the input signal is advanced. The phase-advanced filter substantially attenuates all frequencies above a selected center frequency while avoiding substantial phase margin loss.

19 Claims, 7 Drawing Sheets

PHASE-ADVANCED FILTER FOR ROBUST RESONANCE CANCELLATION

RELATED APPLICATIONS

This application claims priority of U.S. provisional application Ser. No. 60/326,769, filed Oct. 2, 2001.

FIELD OF THE INVENTION

This application relates generally to disc drives and more particularly to phase-advanced filtering of mechanical resonance.

BACKGROUND OF THE INVENTION

Disc drives are data storage devices that store digital data in magnetic form on a rotating storage medium on a disc. Modern disc drives comprise one or more discs that are coated with a magnetizable medium and mounted on the hub of a spindle motor for rotation at a constant high speed. Information is stored on the discs in a plurality of concentric circular tracks typically by an array of transducers ("heads") mounted to an actuator for radial movement of the heads relative to the discs. Each of the concentric tracks is generally divided into a plurality of separately addressable data sectors. The read/write transducer, e.g. a magnetoresistive read/inductive write head, is used to transfer data between a desired track and an external environment. During a write operation, data is written onto the disc track and during a read operation the head senses the data previously written on the disc track and transfers the information to the external environment. Critical to both of these operations is the accurate locating of the head over the center of the desired track.

A problem in disc drives that limits drive performance in general and head position accuracy specifically is component vibration or resonance. Components in the disc drive exhibit resonance modes that adversely affect the performance of disc drive components. For example, because of resonance in the actuator arm, the transducer heads may not be directly over the desired tracks indicated by the servo control of the disc drive. This problem is exacerbated by the recent push to increase the tracks-per-inch (TPI) on the disc surfaces. When TPI is increased, the room for margin in head placement becomes disproportionately smaller, and servo positioning errors more frequent.

Unfortunately, component resonance cannot be completely eliminated without extreme cost. Traditional approaches to the problem of component resonance have involved utilizing a filter to compensate for the component resonances. Typically, a filter is implemented in the signal path having filter parameters such as pass band and attenuation parameters associated with a known resonance mode of a component receiving the signal. The typical filter that is used is a notch filter exhibiting an attenuation band in a generally high frequency associated with the resonance mode of the component. However, every component in a disc drive exhibits resonance modes at different frequencies. Furthermore, the resonant frequency of a given component will vary with temperature. Thus, fine-tuning a notch filter to accommodate vibrations at these many frequencies is difficult, if not impossible. Traditional approaches have included widening the attenuation band in the notch filter to attenuate a wider range of frequencies. Unfortunately, as is well known, this approach leads to significant phase margin loss as the attenuation band is widened. Phase margin loss generally means phase loss occurring at the open loop gain crossover frequency (i.e., the frequency where the open loop gain is 0 decibels (dB)).

Further aggravating the problem, is the use of Mask Read Only Memory (ROM) for disc drive boot software. Mask ROM is a one-time burn-in ROM that is typically a lower cost than other types of ROM such as flash EPROM and is frequently used to store disc drive boot code. Disc drive manufacturers typically provide an integrated circuit (IC) vendor with boot code and the IC vendor burns the boot code into a Mask ROM. The boot code in Mask ROM is run on power up to perform basic initial power up operations of the disc drive servo controller, including seeks and track following to load code from the disc. During power up, reserve tracks are typically accessed to gather or load data and/or executable code stored on the reserve tracks. To precisely position the head over the reserve tracks, a filter is employed to filter out the resonance modes previously discussed. Filter parameters are stored in Mask ROM along with the boot code.

Due to time-to-market demands, sufficient time must be given to the IC vendor to burn the boot code into the Mask ROM. Typically, disc drive manufacturers provide the IC vendor with the boot code three to four months prior to final testing and manufacture of the disc drive. Between the time that the boot code is given to the IC vendor and the time for manufacture, changes are frequently made to components in the disc drive. Changes to components result in changes in resonance modes associated with those components. Thus, the filter parameters included in the boot code given to the IC vendor may not, and frequently do not, exactly correspond to the resonance modes of components that are ultimately used in the disc drive. Consequently, notch filters in boot code often do not adequately attenuate resonant frequencies. One suggested solution is to choose filter parameters in the boot code such that the notch filter or notch filters exhibit a wide attenuation band. However, as discussed above, a wider attenuation band leads to significant phase margin loss during disc drive operation. It is well known in the art that phase margin loss leads to deterioration in disc drive performance, including, but not limited to, increased run-out and reduced servo controller bandwidth.

Accordingly, there is a need for a method and system for effectively attenuating unwanted component resonance in a disc drive, while limiting or avoiding phase margin loss.

SUMMARY OF THE INVENTION

Against this backdrop the present invention has been developed. An embodiment of the present invention is a unique system for attenuating selected resonance modes due to component vibration in a disc drive. More specifically, an embodiment is a phase-advanced filter filtering a selected frequency corresponding to a resonance mode. Still further, an embodiment is a unique low-pass filter providing significant gain attenuation at selected resonance modes, while preventing significant phase margin loss.

Embodiments of the invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages which characterize embodiments of the present invention will be apparent from a reading of the following detailed description and a review of the associated drawings.

DETAILED DESCRIPTION

Figure 1:
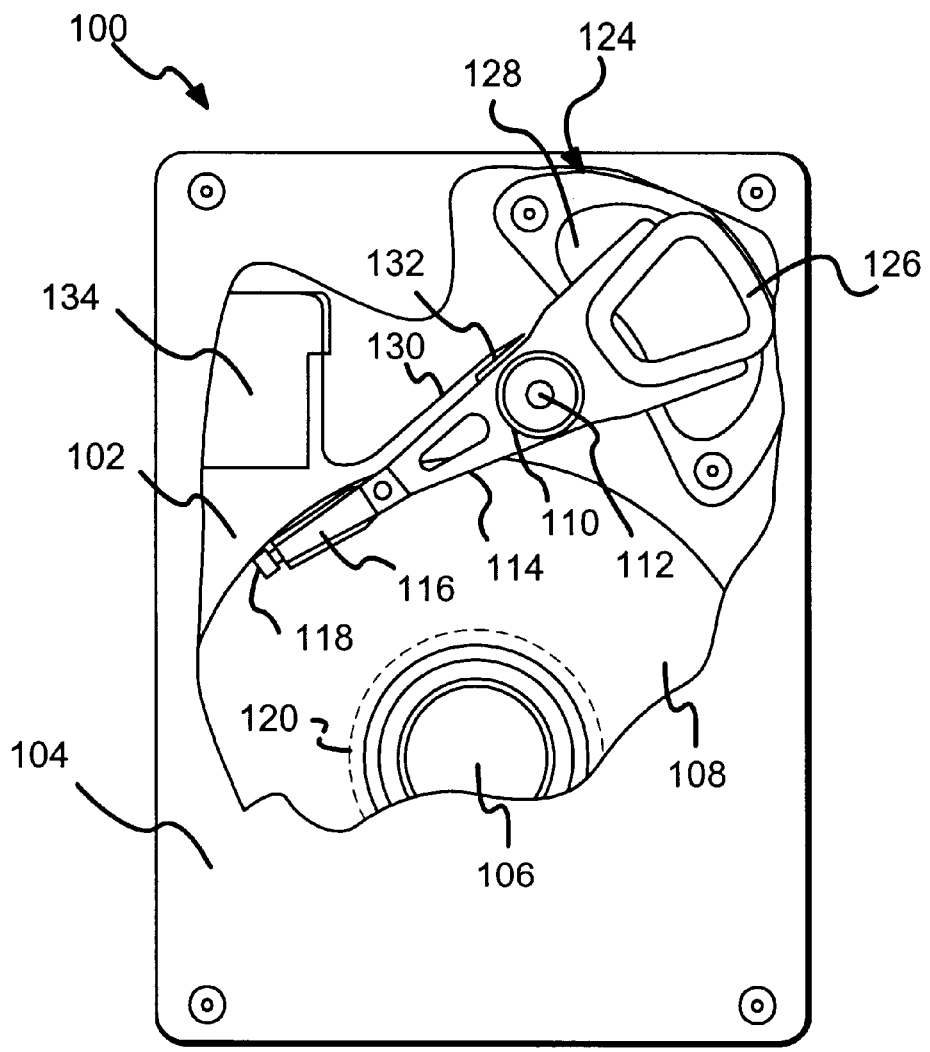
FIG. 1 is a plan view of a disc drive incorporating a preferred embodiment of the present invention showing the primary internal components.

Embodiments of the invention are described in detail below with reference to the drawing figures. When referring to the figures, like structures and elements shown throughout are indicated with like reference numerals.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118, which includes an air bearing slider, enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are typically moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100. The disc drive 100 further includes a drive controller 210 (FIG. 2), which is operable to be coupled to a host system or another controller that controls a plurality of drives. In an illustrative embodiment, the drive controller 210 is a microprocessor, or a digital signal processor. The drive controller 210 is either mountable within the disc drive 100, or is located outside of the disc drive 100 with suitable connection to the actuator assembly 110.

Figure 2:
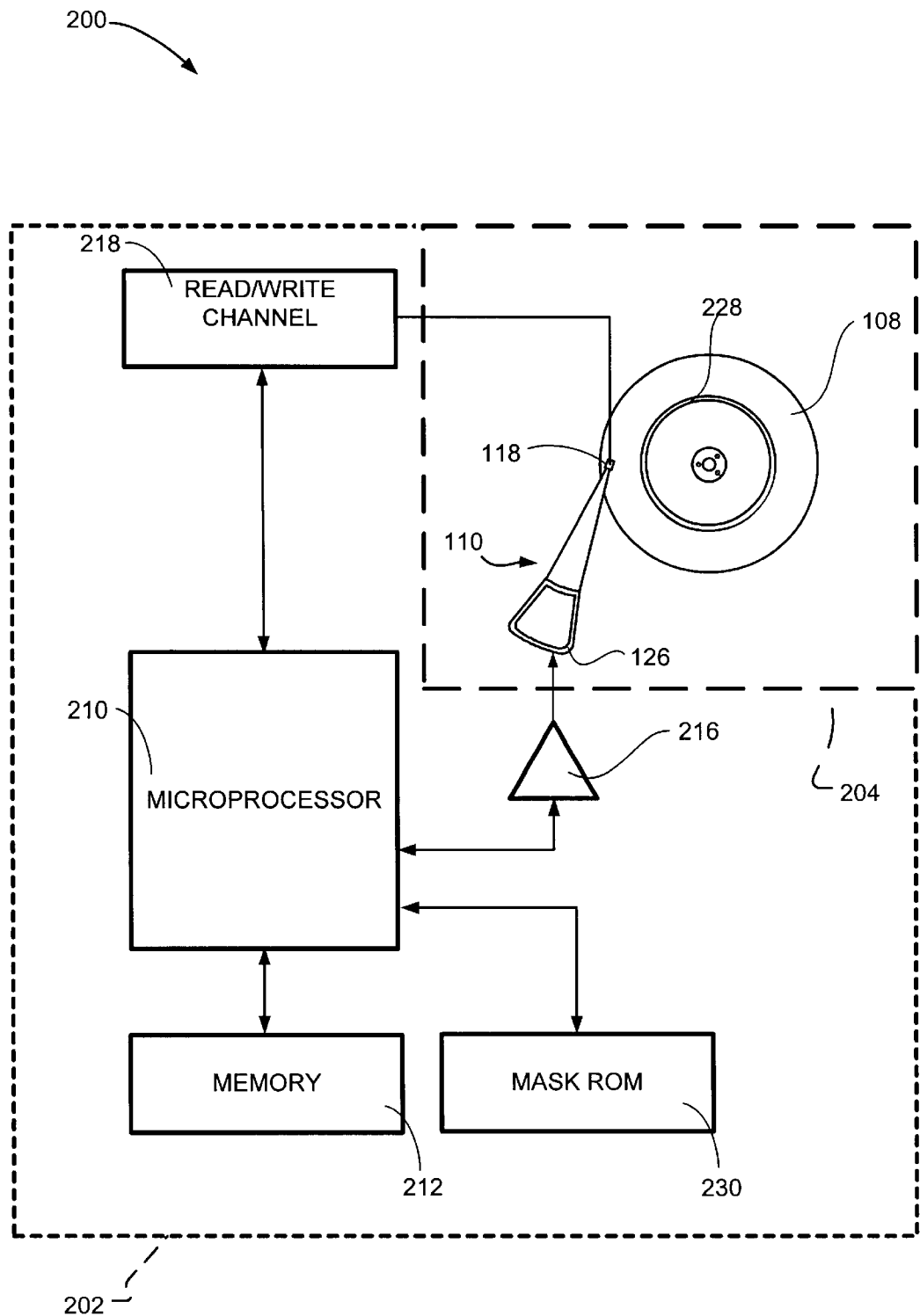
FIG. 2 is a simplified functional block diagram of a servo controller and a plant of the disc drive shown in FIG. 1.

Shown in FIG. 2 is a functional block diagram of what is commonly referred to as the servo loop 200 of the disc drive 100. In general, the servo loop 200 includes a servo controller 202 (small dashed lines) and a plant 204 (large dashed lines). The servo controller 202 includes a disc drive microprocessor 210 having an associated memory 212, a transconductance amplifier 216, a read/write channel 218, and a Mask Read Only Memory (ROM) 230. The plant generally includes the actuator assembly 110, the discs 108, the VCM 124, the heads 118, and the spindle motor 106. In operation, the microprocessor 210 typically receives a seek command from a host computer (not shown) or Mask ROM 230 that indicates that a particular track on the discs 108 is to be accessed. In response to the seek command, the microprocessor 210 determines an appropriate velocity or seek profile to move the head from its current position to the track that is to be accessed. The seek profile is then sent to the transconductance amplifier 216 for amplification. The transconductance amplifier 216 then provides a driving current corresponding to seek profile to the coil 126. In response to the driving current, the actuator assembly 110 accelerates toward the target track and then decelerates and stops the actuator assembly 110 when the head 118 is over the target track and the seek operation is completed.

While reading or writing data from or to the target track, the servo loop 200 performs a track follow operation to keep the head 118 as close to the center of the target track as possible. During a track follow operation, the microprocessor 210 receives a position error signal (PES) from servo control wedges on the disc 108. The PES indicates how far the head 118 is from the center of the target track. In response to receipt of the PES, the microprocessor 210 generates an adjustment signal to adjust the position of the head 118 to be closer to the center of the target track.

One or more reserve tracks 228 on the disc 108 contain data and software employed during runtime operation. The runtime software is copied from the reserve tracks 228 into a high-speed memory, such as the memory 212, during power up, or boot up. Computer-executable instructions residing in a Mask ROM 230 are executed at power up and referred to as boot code. The boot code in Mask ROM 230 contains instructions for seeking to and track following the reserve tracks 228 during power up. Seek commands are embedded in the boot code to cause the transducer head 118 to be positioned over a reserve track 228 and follow the reserve track 228. During seek and track follow operations, a digital phase-advanced filter in the boot code filters out mechanical resonance. Thus, the phase-advanced filter is particularly suitable for improving performance during track following over the reserve tracks 228 during power up. After the head 118 settles on a reserve track, the phase-advanced filter filters out unwanted resonance to keep the head 118 as close to the center of the track as possible, without substantial loss of phase-margin.

For a given seek command, the microprocessor 210 computes a seek profile comprising various steps, referred to herein as servo states. In this embodiment, the seek profile includes five servo states. A first "start move" state provides the appropriate signal to start the actuator moving towards the desired track. A second "constant acceleration" state provides the appropriate signal to drive the actuator through the constant acceleration portion of the seek. A third "velocity profile/square root" state provides the appropriate signal for controlling the actuator velocity to a predefined profile. A fourth "linear" state provides the appropriate signal to drive the actuator through the linear portion of the seek. Finally, a fifth "settle" state provides the appropriate signal for controlling the final "settling" of the actuator, and thus the head, in position over the desired track. That is, the settle state provides the appropriate signal to transition the actuator from track seeking to track following. It will be understood to one skilled in the art that the precise number, nomenclature, and/or function of each of the states in a seek profile may vary from one disc drive to another and/or from one manufacturer to another. As such, it will be understood that the five-state seek profile described herein is but one example of a possible seek profile that may be used in conjunction with the present invention.

Most relevant to the present invention is filtering unwanted resonance after the seek operation and during track following. The head 118 settles on the target track at the end of the seek operation. Then, the microprocessor 210 executes a track follow operation. During the track follow operation, the microprocessor 210 executes servo control code (e.g., servo control module 400 in FIG. 4) to hold the read or write element of the head 118 as close to the center of the target track as possible while data is read from and/or written to the target track. The microprocessor 210 senses servo control data from the target track. Servo control data on the track includes a position error signal (PES) that the microprocessor 210 uses to monitor how far the head 118 is from the center of the track. In response to a deviation from the center of the track, the microprocessor 210 sends a control signal to the VCM 124 (FIG. 1) to correct for the deviation. The control signal is filtered in accordance with an embodiment of the present invention before being sent to the VCM 124. More particularly, before the VCM 124 receives the control signal, the microprocessor 210 executes phase-advanced filter code (e.g., phase-advance filter module 412 in FIG. 4) filtering frequencies out of the control signal that would otherwise excite resonance in the VCM 124.

Figure 3:
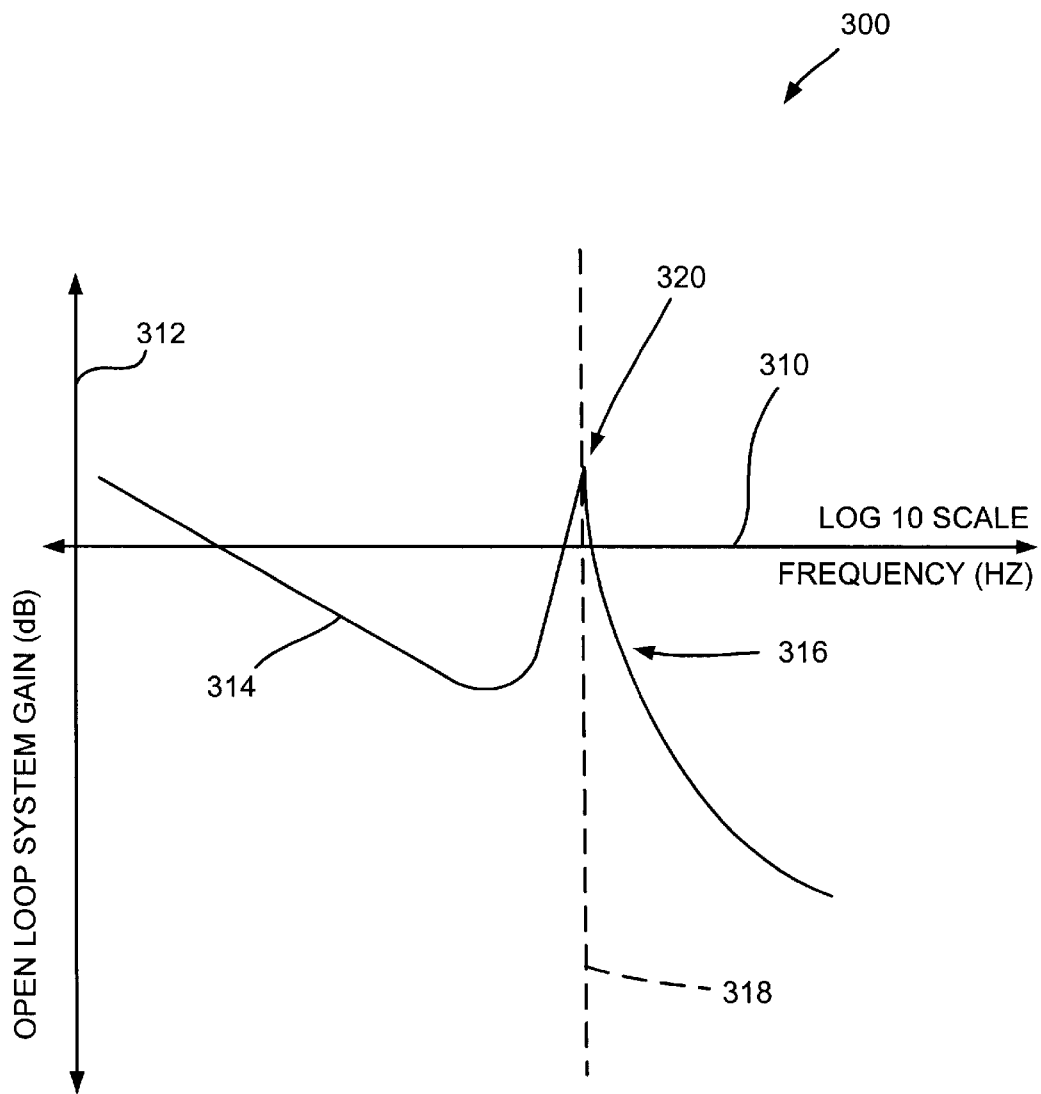
FIG. 3 is a bode plot showing mechanical resonance in a disc drive.

Each of the mechanical components of the disc drive 100 may have various resonant modes that, if excited by an external energy source, will cause the mechanical components to oscillate at the natural resonance frequencies of the component. FIG. 3 illustrates an open loop Bode plot 300 showing a mechanical resonance in a disc drive. For clarity, the phase information has been removed from the Bode plot 300 and the plot is not shown to scale. The x-axis 310 represents the frequency of the excitation energy, while the y-axis 312 represents the open loop system velocity gain in decibels (dB). The open loop system velocity gain 314 generally drops at the rate of 20 dBs per decade. However, as shown in FIG. 3, a mechanical resonance causes a sharp increase 316 in the system gain. The increase 316 in the system gain caused by the mechanical resonance depicted is centered at a center frequency 318 and has a peak amplitude 320.

Figure 4:
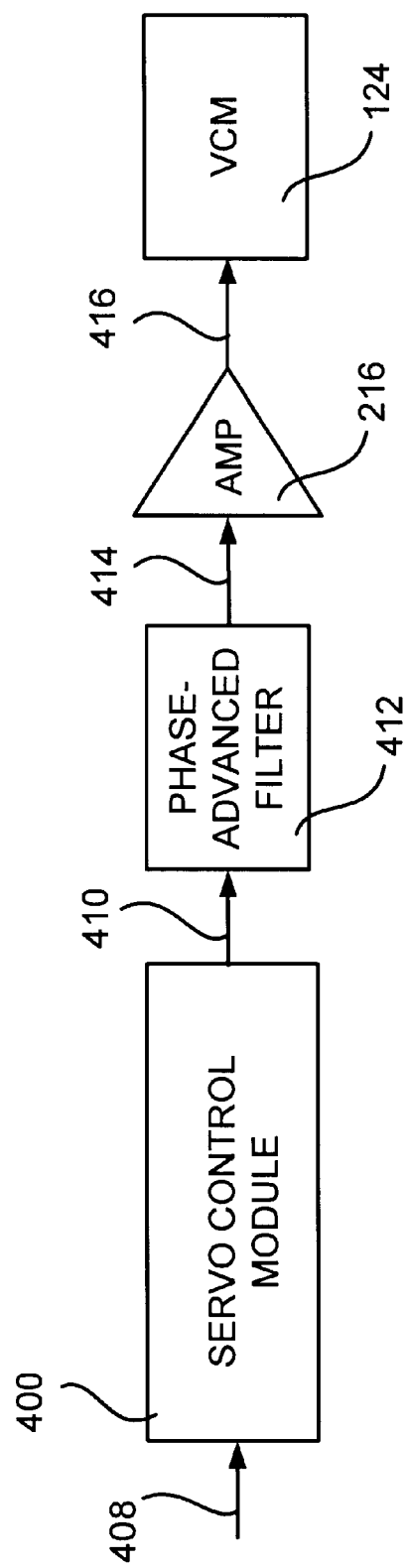
FIG. 4 illustrates a portion of the servo controller and the plant shown in FIG. 2.

The memory 212 and the Mask ROM 230 of FIG. 2 include computer executable instructions for implementing a servo control module (e.g., servo control module 400 of FIG. 4) and a phase-advanced filter (e.g., phase advanced filter module 412 of FIG. 4). The computer executable instructions are executed by the microprocessor 210 to perform the seeking and track following operations necessary to accurately position the read or write element on the head 118 over a target track.

FIG. 4 illustrates a simplified block diagram of the operational environment of a phase-advanced filter module 412 according to an illustrative embodiment. In this embodiment, and other embodiments described herein, the logical operations of the phase-advanced filter module 412 and the servo control module 400 may be implemented as a sequence of computer implemented steps or program modules running on a microprocessor, such as, microprocessor 210. It will be understood to those skilled in the art that the phase-advanced filter module 412 and the servo control module 400 may also be implemented as interconnected machine logic circuits or circuit modules within a computing system.

Additionally, the servo control module 400 and the phase-advanced filter 412 may be implemented in separate components of the disc drive 100, such as a dedicated servo controller and a dedicated phase-advanced filter 412, respectively. The implementation is a matter of choice dependent on the performance and design requirements of the disc drive 100. As such, it will be understood that the operations, structural devices, acts, and/or modules described herein may be implemented in software, in firmware, in special purpose digital logic, and/or any combination thereof without deviating from the spirit and scope of the present invention as recited within the claims attached hereto. Furthermore, the various software routines or software modules described herein may be implemented by any means as is known in the art. For example, any number of computer programming languages, such as "C", "C++", Pascal, FORTRAN, assembly language, Java, etc., may be used. Furthermore, various programming approaches such as procedural, object oriented or artificial intelligence techniques may be employed.

In this embodiment, the computer implemented steps and corresponding digital data that comprise the operations of the phase-advanced filter 412 and the servo control module 400 are preferably stored on computer readable media. As used herein, the term computer-readable media may be any available media that can be accessed by a processor or component that is executing the functions, steps and/or data of the phase-advanced filter 412. By way of example, and not limitation, computer-readable media might include computer storage media that includes volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computer or processor which is executing the operating code. An embodiment of the phase-advanced filter 412 is particularly beneficial for, but not limited to, use in Mask ROM boot code. Boot code is employed to perform basic seek and track following operations to load code and data from the disc 108 during power up of a disc drive 100.

Computer-readable media might include communication media that embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Processing of a typical seek or track follow operation is shown in FIG. 4. The servo control module 400 receives a command 408 and generates, in response, a control signal 410 (during either a seek or track follow operation) composed of frequency components that range from direct current (DC) to multiple kilohertz or higher components. During a track follow operation, the control signal 410 is generally related to a position error signal (PES) detected on the disc. The PES indicates to the servo control module 400 how far the head 118 is from center of the track being followed. The servo control module 400 generates the control signal 410 designed to adjust the position of the head 118 closer to the track center. The control signal 410 is provided to a phase-advanced filter 412, which reduces the frequency components in the signal that are at or near the resonance frequencies of the disc drive mechanical structure. The phase-advanced filter 412 then provides a filtered control signal 414 to the transconductance amplifier 216 which amplifies the filtered control signal 414. The amplifier 216 then provides a driving current 416 to the coil 126 of the actuator VCM 124 to position the head 118 at the desired location over the disc 108. The filtered control signal 414 reduces risk of exciting the disc drive mechanical structure into oscillation.

Various methods of implementing a phase-advanced filter 412 may be used with respect to this embodiment. One illustrative method of implementing a phase-advanced filter 412 is to employ the discrete-time domain transfer function shown in equation (1):

$$H(z) = \frac{B_0 + B_1 z^{-1} + B_2 z^{-2} + B_3 z^{-3}}{1 + A_1 z^{-1} + A_2 z^{-2} + A_3 z^{-3}}, \quad (1)$$

where $A_1$, $A_2$, $A_3$, $B_0$, $B_1$, $B_2$, and $B_3$ are low-pass filter constants describing the frequency, depth, and width of the band pass. These constants may be predetermined before the manufacture of the disc drive. Alternatively, these constants may be determined experimentally during the manufacture of the disc drive. The equation may be given by the more general form:

$$H(z) = \frac{b_0 + b_1 z + \cdots + b_m z^m}{a_0 + a_1 z + \cdots + a_n z^n} (z+1)^{n-m}, \quad (2)$$

where $n-m >= 1$. The exemplary transfer function $H(z)$ is generally referred to as a low-pass filter. More specifically, it is a digital filter having a factor of $(z+1)$ in the numerator. In an alternative embodiment, the factor $(z+1)$ may be replaced with a factor $2z$. Using the factor $2z$ advances the phase by $\omega T/2$, where T is the sampling period, while the gain is almost unaffected. Thus, the degree of phase advancement is proportional to the frequency. For example, when $\omega = 2\pi * f_N$, where $f_N$ is the Nyquist frequency, the phase of the signal output from the phase-advance filter is advanced by 90° compared to the phase of the input signal.

In the analog, or s-domain, the transfer function may be characterized generally as having more poles than zeros. An analog filter in an embodiment of the present invention would employ a transfer function of the form illustrated as follows in Equation 3:

$$H(s) = \frac{b_0 + b_1 s + \cdots + b_m s^m}{a_0 + a_1 s + \cdots + a_n s^n} \quad (3)$$

The phase-advanced filter 412 may be implemented in software. An exemplary portion of assembly code that implements a software phase-advance filter 412 in one embodiment is shown in Table 1.

TABLE 1

```
@*define PhaseAdvanceLowPassFilter(VarPointer,CoeffPointer,Order)    @local(loop05)
            movw     word ptr (@VarPointer+@Order*2),R3
            movw     IDX0,#@VarPointer
            movw     R2,#@CoeffPointer
            comul    [IDX0+],[R2+]
            movw     MRW,#(@Order*2-1)
@loop05:    -usr1    comacm [IDX0+],[R2+]
            jmpa     cc__nusr1,@loop05
            coshl    #(16-LP_QSCALE)
            movw     R3,MAH
            movw     word ptr (@VarPointer+@Order*4),R3
            @endd
```

The software algorithm of Table 1 is a routine implementing a digital low-pass phase-advanced filter 412. Generally, the routine accepts a list of input parameters, including a pointer to one or more variables (VarPointer), a pointer to one or more coefficients (CoeffPointer), and an order (Order), representing the order of the filter 412. The routine processes the input data by iteratively multiplying each coefficient with its associated variable. The output of each iteration is saved for input to the next iteration. The values output by each iteration are used to develop a state matrix. The number of states in the state matrix depends on the order of the phase-advanced filter 412. The code shown in Table 1 is executed by a fixed-point microprocessor, so the output is scaled in the "coshl" step. The exemplary software in Table 1 is assembly code but any software language known in the art may be used for implementing the phase-advanced filter 412. The algorithm illustrated in Table 1 is one exemplary method of implementing the phase-advanced filter 412, and it is envisioned that other algorithms may be utilized that fall within the scope of the present invention.

Figure 5:
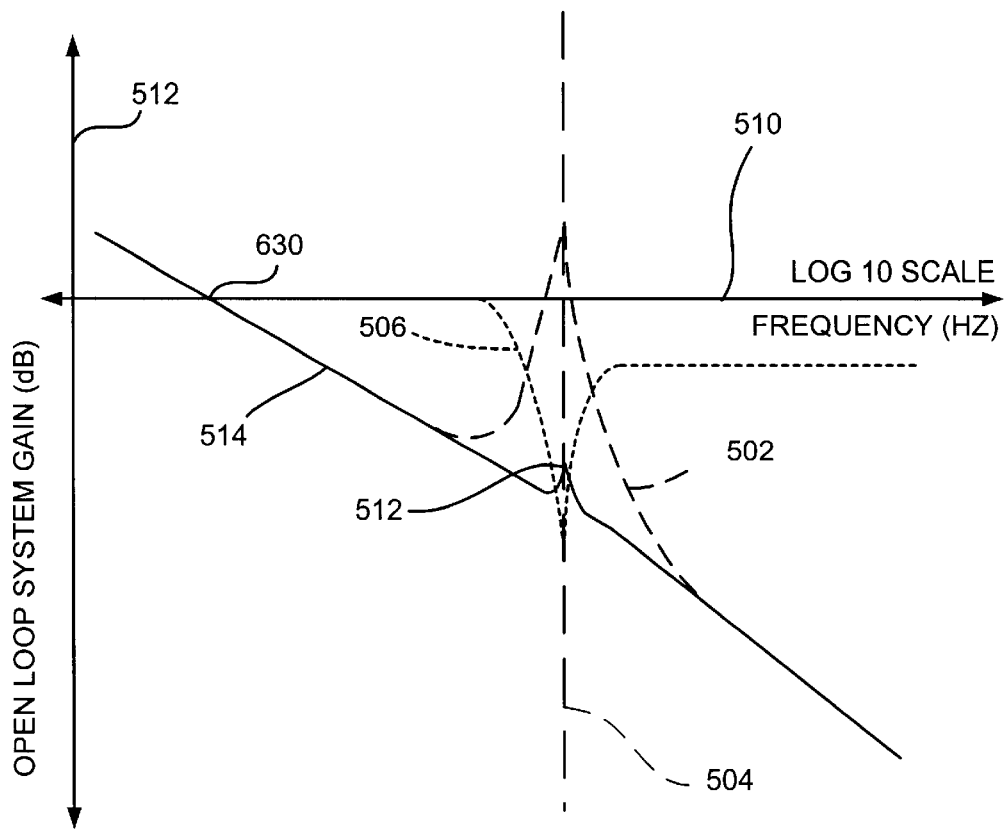
FIG. 5 is a bode plot showing the effects of a phase-advanced filter on the mechanical resonance shown in FIG. 3.

The effect of the phase-advanced filter 412 can be seen in the summation Bode plot of FIG. 5, which for clarity's sake does not show the phase response and is not shown to scale. The x-axis 510 represents the frequency of the driving energy, while the y-axis 512 represents the system gain in decibels (dB). FIG. 5 shows a mechanical resonance 502 (larger, dashed lines) centered at center frequency 504. Also shown is the frequency response 506 (short, dashed lines) of the phase-advanced filter 412. It can be seen that phase-advanced filter 412 appreciably attenuates the driving energy about the mechanical resonance 502, with the maximum attenuation occurring at the center frequency 504 of the mechanical resonance. FIG. 5 further shows the open loop frequency response 514 with the phase-advanced filter 412 active. When the phase-advanced filter 412 is activated, the open loop response 514 is a summation of the original response and the phase-advanced filter 412 response. That is, the phase-advanced filter 412 works on the principle of superposition. It can be seen that the peak amplitude 512 at center frequency 504 is now well below 0 dB.

When the phase-advanced filter response 506 is properly located, as in FIG. 5, the driving force energy at the center frequency 504 of the mechanical resonance 502 can be reduced so that there will be little or no energy made available to excite the mechanical structure. It will be understood that one phase-advanced filter 412 may be used to eliminate a number of resonance modes in the disc drive 100. Advantageously, and unlike when utilizing traditional notch filters, it is not necessary to center multiple phase-advanced filters 412 at multiple center frequencies corresponding to mechanical resonance modes. One phase-advanced filter 412 can guarantee attenuation substantially equal to −15 decibels (dB) above a selected frequency (e.g., center frequency 504).

Figure 6:
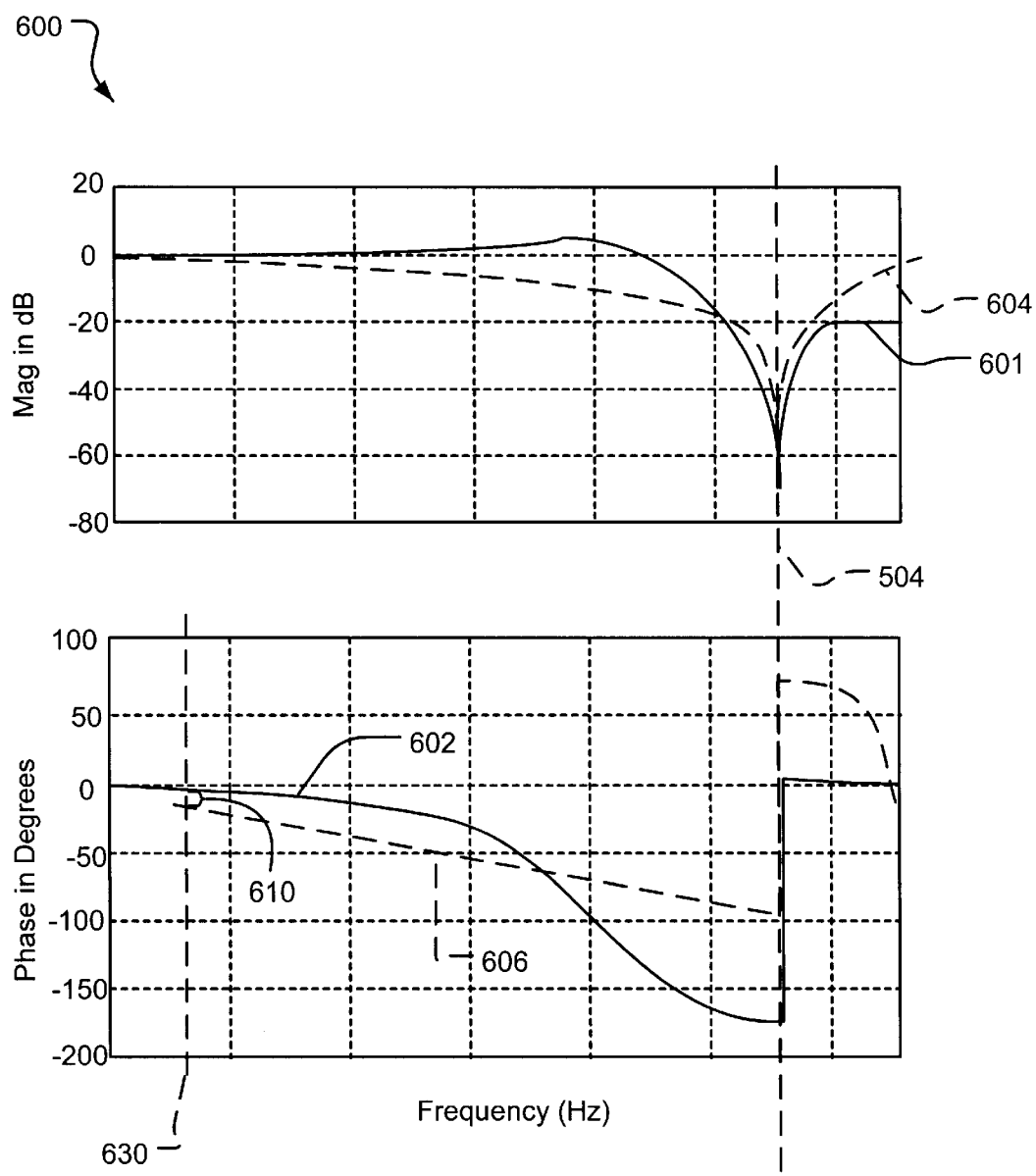
FIG. 6 is a bode plot showing the response of the phase-advanced filter to the control signal transmitted from the servo control module of FIG. 4.

FIG. 6 is a Bode plot 600 showing a closed-loop response of the phase-advanced filter 412 as compared to a closed-loop response of a typical notch filter. The Bode plot 600 includes a phase-advanced filter magnitude response 601 (upper solid line) and a phase-advanced filter phase response 602 (lower solid line). The phase-advanced responses 601 and 602 illustrated in the Bode plot 600 are responses exhibited by an exemplary embodiment of a phase-advanced filter 412. For clarity, the Bode plot 600 is not shown to scale. As illustrated by the phase-advanced filter magnitude response 601, the phase-advanced filter 412 applies substantial attenuation to the control signal 410 around the center frequency 504 to advantageously filter out the mechanical resonance 502. Furthermore, the magnitude response 601 provides −20 dB of attenuation at frequencies substantially greater than the center frequency 504. Experimentation has shown that the phase-advanced filter 412 can guarantee at least −15 dB gain attenuation above 10 KHz when the center frequency is located at 11 KHz. Thus, the phase-advanced filter 412 is robust above 10 KHz, in that only one phase-advanced filter 412 is generally required to attenuate multiple resonance modes above 10 KHz.

A traditional notch filter magnitude response 604 is shown in FIG. 6 for illustrative purposes. In contrast to the phase-advance filter magnitude response 601, a traditional notch filter magnitude response 604 (dashed line) includes an attenuation notch around the center frequency 504. Unlike a phase-advanced filter 412, a traditional notch filter generally attenuates only around the center frequency 504, but not at frequencies substantially above the center frequency 504. Thus, utilizing notch filters, in order to attenuate resonant modes above the center frequency 504, more notch filters are required; i.e., a notch filter for each unwanted resonant mode. As is known, the addition of notch filters undesirably reduces the phase margin. However, embodiments of the phase-advanced filter 412 substantially reduce or eliminate phase margin loss, as is shown by the phase-advanced filter phase response 602.

The phase-advanced filter phase response 602 illustrates the difference in phase between the filtered control signal 414 and the control signal 410 with respect to frequency. It can be seen that the phase does not decrease substantially between 0 Hz and the open loop gain cross over frequency 630. For comparison, a traditional notch filter phase response 606 (lower dashed line) is shown. The notch filter phase response 606 drops substantially at the open loop gain crossover frequency 630. The difference in phase loss 610 is directly related to the difference in phase margin loss created by the phase-advanced filter 412 and the notch filter. The phase-advanced filter 412 substantially reduces or eliminates phase margin loss. The difference 610 (and thus the difference in phase margin loss) has been experimentally shown to be around 10°. Additionally, to achieve the same attenuation at frequencies above the center frequency 504 as the attenuation of the phase-advanced filter 412, more than one notch filter would be required. Adding more notch filters will further increase the difference in phase loss 610. Thus, one phase-advance filter 412 substantially attenuates resonant frequencies above the center frequency 504, while simultaneously substantially reducing or eliminating any phase margin loss. Reduction of phase margin loss reduces the risk of run-out and reduces the loss in bandwidth of the servo loop 200.

Figure 7:
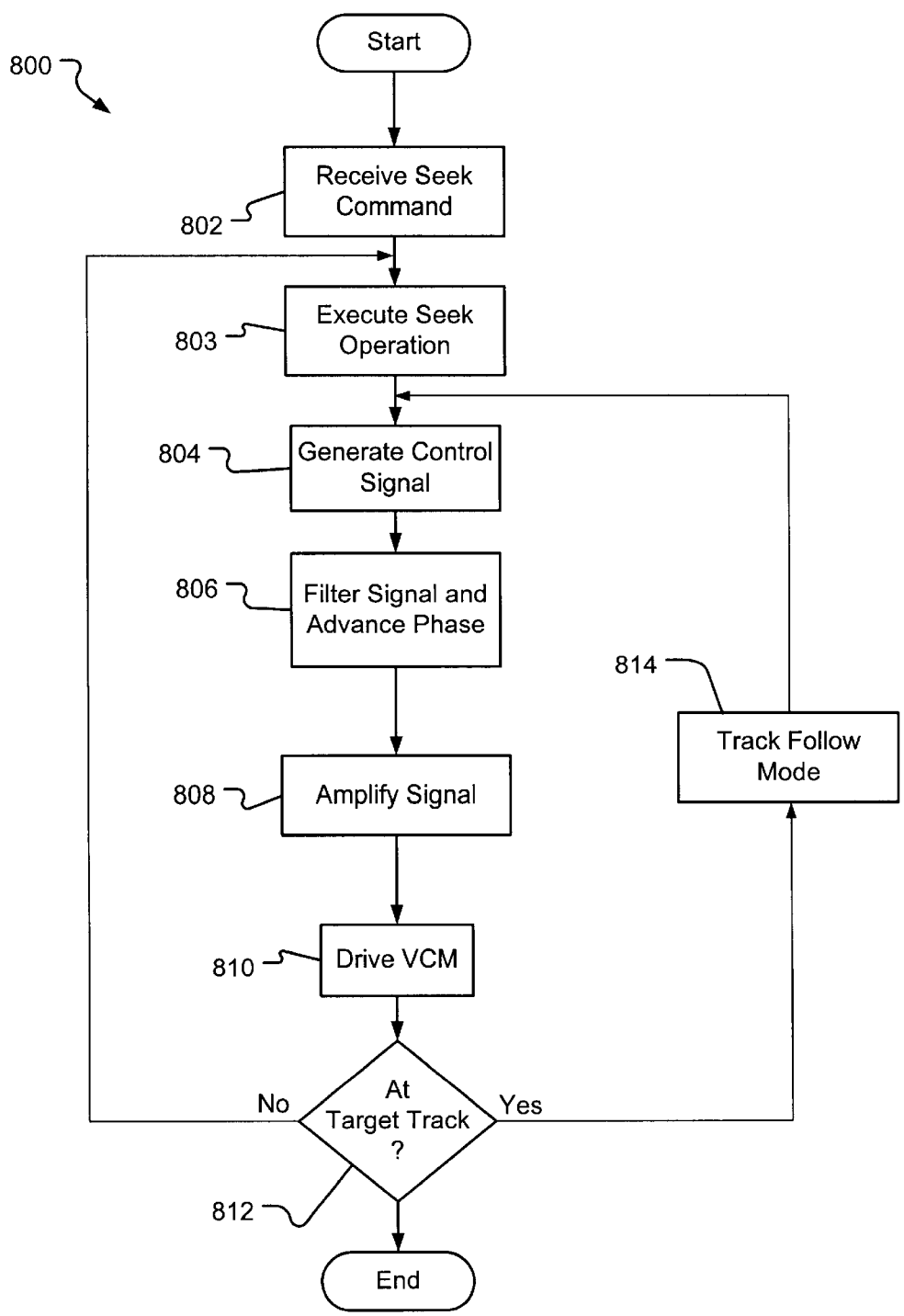
FIG. 7 is a process flow diagram illustrating exemplary operations employed by the portion of the servo loop illustrated in FIG. 4.

FIG. 7 is a process flow diagram 800 illustrating exemplary operations employed by the portion of the servo loop 200 illustrated in FIG. 4. In a receiving operation 802, the microprocessor 210 receives a seek command to position the head 118 at a target track. In response to receipt of the seek command, the microprocessor 210 performs a seeking operation 803, wherein a seek profile signal is generated as discussed above, to accelerate the head 118 toward the target track. Control transfers to a generating operation 804 wherein a control signal 410 is generated to adhere to the seek profile signal of the seeking operation 803. The generating operation 804 may be implemented by the microprocessor 210 executing a servo control module 400 shown in FIG. 4.

Control then transfers to a filtering operation 806 wherein the control signal 410 is filtered by a phase-advanced filter 412 to generate a filtered control signal 414. The filtering operation 806 substantially attenuates frequencies above a cut-off frequency and advances the phase of the control signal 410 so that phase margin loss is substantially reduced or avoided as discussed above. The transfer function associated with the filtering operation 806 is given in equations 1, 2 and/or 3. Control then transfers to an amplifying operation 808 wherein the filtered control signal 414 is amplified to create a driving signal 416 for driving the voice coil motor 124. Control then transfers to a driving operation 810 wherein the driving signal 416 is transmitted to the voice coil motor 124 whereby the position of the actuator arm is adjusted in response to the voice coil motor being energized by the drive current. Control then transfers to a determining operation 812 wherein it is determined whether the head 118 is positioned over the target track. Typically the determination is made by detecting position signals read from the disc during the seek operation and feeding those position signals back to the microprocessor 210. If the head 118 is not positioned over the target track, control transfers to the seeking operation 803, wherein the seeking operation continues until the head 118 is positioned over the target track.

If, on the other hand, it is determined in the determining operation 812 that the head is positioned over the target track, control transfers to a track following operation 814, wherein a track following mode is entered. Entering the track following mode, involves settling the head 118 over the target track. After settling over the target track, PES is read from the disc 108 and the head position is substantially continuously adjusted so that the head is as close to the center of the track as possible. Control then transfers to the generating operation 804 wherein a control signal 410 related to the PES is generated. The control signal 410 that is generated includes frequency components as described above. Control then transfers to a filtering operation 806 wherein the control signal 410 is filtered by a phase-advanced filter 412. The filtering operation 806 substantially attenuates frequencies above a selected center frequency and advances the phase of the control signal so that phase margin loss is substantially reduced or avoided as described in embodiments above. The transfer function associated with the filtering operation 806 is given in equations 1, 2 and/or 3. Control then transfers to an amplifying operation 808 wherein the filtered signal is amplified to create a drive current for driving the voice coil motor. Control then transfers to a driving operation 810 wherein the drive current is transmitted to the voice coil motor to adjust the position of the actuator arm more closely to the center of the target track. Thus, the phase-advanced filter 412 may be used to perform filtering during either a seek operation or a track following operation.

In summary, an embodiment may be viewed as a disc drive (such as 100) that has a data disc (such as 108) with concentrically arranged data tracks (such as 228) and a voice coil motor (such as 124) for positioning a transducer head (such as 118) over a selected track (such as 228). The disc drive (such as 100) includes a servo control module (such as 400) that receives a seek command (such as 408) and transmits a control signal (such as 410) to the voice coil motor (such as 124). The embodiment further includes phase-advanced filter (such as 412) that filters the control signal (such as 410) such that a range of frequencies above a predetermined center frequency (such as 504) are substantially attenuated and phase margin loss is substantially avoided.

An embodiment may also be viewed as a method of reducing component resonance (such as 320) in a disc drive (such as 100) by receiving a seek command (such as 408) to seek to a target track (such as 228), generating (such as 320) a seek control signal (such as 410) to move the a head (such as 118) to the target track (such as 228), and filtering (such as 806) the seek control signal (such as 410) with a phase-advanced filter (such as 412) to generate a filtered seek control signal (such as 414). The method additionally includes driving a voice coil motor (such as 124) with a driving current (such as 416) based on the filtered seek control signal (such as 414) to position the head (such as 118) over the target track (such as 228).

The method may further include entering a track follow mode (such as 814). The track follow mode typically involves settling the head over the target track (such as 228) and detecting a position error signal (PES) from the target track (such as 228). During track follow mode, the method involves generating (such as 804) a track follow control signal (such as 410) based on the PES. Following the track further involves filtering (such as 806) the track follow control signal (such as 410) with a phase-advanced filter (such as 412) to generate a filtered track follow control signal (such as 414) before driving (such as 810) a voice coil motor (such as 124) with a driving current (such as 416) based on the filtered track follow control signal (such as 414).

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the phase-advanced filter could be employed in other (non-disc drive) environments where mechanical resonance modes arise and reduce performance of servo control. Additionally, analog versions of the phase-advanced filter may be suitable for analog environments and may be readily apparent to those skilled in the art. Numerous other changes may be made which will readily suggest themselves to those skilled in the art and which are encompassed in the spirit of the invention disclosed and as defined in the appended claims.

What is claimed is:

1. A disc drive including a data disc having a plurality of concentrically arranged data tracks and a voice coil motor mounted adjacent the data disc for positioning a transducer head over a selected track comprising:

a servo control module receiving a command and transmitting a control signal to the voice coil motor; and a phase-advanced filter in operable communication with the servo control module filtering the control signal such that a range of frequencies above a predetermined center frequency are substantially attenuated and phase margin loss is substantially avoided.

2. The disc drive of claim 1 wherein the phase-advanced filter includes a transfer function having more poles than zeros.

3. The disc drive of claim 2 wherein the transfer function further comprises a factor of (z+1) in the numerator.

4. The disc drive of claim 2 wherein the transfer function further comprises a factor 2z in the numerator.

5. The disc drive of claim 2 wherein the transfer function is a discrete-time domain transfer function of the form:

$$H(z) = \frac{b_0 + b_1 z + \cdots + b_m z^m}{a_0 + a_1 z + \cdots + a_n z^n}(z+1)^{n-m},$$

where n−m>=1, $b_0$–$b_m$ are coefficients, $a_0$–$a_m$ are coefficients.

6. The disc drive of claim 1 wherein the phase-advance filter attenuates the control signal by at least −15 decibels above the center frequency while simultaneously not generating more than 10 degrees of phase margin loss.

7. A method of reducing component resonance in a disc drive comprising steps of:
   (a) receiving a seek command to seek to a target track;
   (b) responsive to receipt of the seek command, generating a seek control signal to move the a head to the target track;
   (c) filtering the seek control signal with a phase-advanced filter having filter parameters corresponding to a range of frequencies associated with the component resonance to generate a filtered seek control signal; and
   (d) driving a voice coil motor with a driving current based on the filtered seek control signal to position a head in the disc drive over the target track.

8. The method of claim 7 wherein the target track has a center, further comprising steps of:
   (e) settling the head over the target track;
   (f) detecting a position error signal (PES) from the target track;
   (g) generating a track follow control signal based on the PES;
   (h) filtering the track follow control signal with a phase-advanced filter having filter parameters corresponding to a range of frequencies associated with the component resonance to generate a filtered track follow control signal; and
   (i) driving a voice coil motor with a driving current based on the filtered track follow control signal to position the head more closely to the center of the target track.

9. The method of claim 8 wherein the track follow control signal comprises a phase and the filtering step (c) comprises steps of:
   (c)(1) advancing the phase by $\omega T/2$, where T is the sampling period of the track follow control signal, and $\omega$ is the frequency in radians.

10. The method of claim 7 wherein the filtering step (c) comprises steps of:
    (c)(1) applying a digital low-pass filter to the seek control signal.

11. The method of claim 10 wherein the applying step (c)(1) comprises steps of:
    (c)(1)(i) implementing a transfer function having a (z+1) factor in the numerator.

12. The method of claim 10 wherein the applying step (c)(1) comprises steps of:
    (c)(1)(i) implementing a transfer function having a 2z factor in the numerator.

13. The method of claim 10 wherein the applying step includes filtering the track follow control signal with a discrete-time domain transfer function of a general form:

$$H(z) = \frac{b_0 + b_1 z + \cdots + b_m z^m}{a_0 + a_1 z + \cdots + a_n z^n}(z+1)^{n-m},$$

where n−m>=1, $b_0$–$b_m$ are coefficients, and $a_0$–$a_m$ are coefficients.

14. A disc drive including a data disc having a surface with a plurality of concentrically arranged data tracks and a voice coil motor mounted adjacent the data disc for positioning a transducer head over a selected track comprising:
    a servo control receiving head position data and driving a voice coil motor with a drive current signal to position the transducer head over the center of the selected track;
    a means for filtering the drive current signal while simultaneously substantially preventing phase margin loss.

15. The disc drive of claim 14 wherein the means for filtering the drive current signal to comprise:
    a low pass filter.

16. The disc drive of claim 15 wherein the low pass filter comprises a digital filter having a transfer function with a factor of (z+1) in the numerator.

17. The disc drive of claim 15 wherein the low pass filter comprises a digital filter having a transfer function with a factor of 2z in the numerator.

18. The disc drive of claim 15 wherein the low pass filter comprises a digital filter operable to advance the phase of the drive current signal by $\omega T/2$, where T is the sampling period and $\omega$ is the frequency in radians.

19. The disc drive of claim 14 wherein the means for filtering comprises:
    a low-pass filter outputting a filtered signal wherein phase loss is no more than ten degrees at the open loop gain crossover frequency and attenuation is at least 15 dB within a selected frequency range.

* * * * *